(12) United States Patent
Takagi et al.

(10) Patent No.: US 6,285,948 B1
(45) Date of Patent: Sep. 4, 2001

(54) CONTROL APPARATUS AND METHOD HAVING PROGRAM REWRITING FUNCTION

(75) Inventors: Noboru Takagi, Obu; Hajime Nomura, Okazaki, both of (JP)

(73) Assignee: Denso Corporation, Kariya (JP)

( * ) Notice: Subject to any disclaimer, the term of this patent is extended or adjusted under 35 U.S.C. 154(b) by 0 days.

(21) Appl. No.: 09/543,897

(22) Filed: Apr. 6, 2000

(30) Foreign Application Priority Data

May 26, 1999 (JP) .................................................. 11-146646

(51) Int. Cl.[7] ............................. G06F 15/02; B60R 25/10
(52) U.S. Cl. ..................... 701/115; 307/10.5; 340/5.23
(58) Field of Search ..................................... 701/101, 102, 701/103, 114, 115; 307/10.1, 10.3, 10.4, 10.5; 340/5.2, 5.23, 5.26, 5.72, 5.61, 5.64

(56) References Cited

U.S. PATENT DOCUMENTS

| | | | |
|---|---|---|---|
| 5,610,574 | * 3/1997 | Mutoh et al. | 307/10.5 |
| 5,763,958 | * 6/1998 | Yamamoto et al. | 307/10.5 |
| 5,769,051 | * 6/1998 | Bayron et al. | 701/115 |
| 5,802,485 | * 9/1998 | Koelle et al. | 701/115 |
| 5,803,043 | * 9/1998 | Bayron et al. | 701/115 |
| 5,806,015 | * 9/1998 | Kimoto | 701/115 |
| 5,828,977 | 10/1998 | Hayashi et al. | 701/115 |
| 5,896,095 | * 4/1999 | Hill et al. | 340/5.2 |
| 6,163,271 | * 12/2000 | Yoshizawa et al. | 340/5.26 |
| 6,194,991 | * 2/2001 | Barrs et al. | 340/5.72 |

FOREIGN PATENT DOCUMENTS 0 835 790 A2   4/1998   (EP) .
09-128229      5/1997   (JP) .

* cited by examiner

Primary Examiner—Willis R. Wolfe
(74) Attorney, Agent, or Firm—Nixon & Vanderhye P.C.

(57) ABSTRACT

In an engine control apparatus, a control program is stored in a non-volatile rewritable memory such as EEPROM. The control program is rewritten by a rewriting tool. Specifically, a key identification code is retrieved from a vehicle key, and compared with a key reference code stored in the memory. If the compared codes are the same, a program identification code is retrieved from the rewriting tool, and compared with a program reference code stored in the memory. If the compared codes are the same, a new control program is transmitted from the rewriting tool to the memory to rewrite the control program with the new control program.

26 Claims, 5 Drawing Sheets

CONTROL APPARATUS AND METHOD HAVING PROGRAM REWRITING FUNCTION

CROSS REFERENCE TO RELATED APPLICATION

This application relates to and incorporates herein by reference Japanese Patent Application No. 11-146646 filed on May 26, 1999.

BACKGROUND OF THE INVENTION

The present invention relates to electronic control apparatuses and methods, and more particularly to a program rewriting control and devices therefor which disables unauthorized rewriting of programs.

Many electronic control apparatuses are proposed for preventing intrusion into automotive vehicles and burglary of the same. In some apparatuses, an identification code (ID) of a key which a vehicle user uses is compared with a key ID which is stored in a non-volatile electrically erasable programmable read-only memory (EEPROM) of an electronic control unit (ECU) for engine control. Engine operations such as fuel injection and ignition are prohibited, if the compared key Ids do not agree or coincide.

It is a recent trend to design ECUs to be capable of rewriting or updating engine control programs stored in respective EEPROMs by using program rewriting tools. Thus, any defects in the control program of the ECU can be rectified without entirely replacing the ECU with a new one.

The program rewriting tool may be used to illegally rewrite the control program. That is, it may be used to rewrite control programs having an anti-burglary function (key ID check program) to control programs having no anti-burglary function by erasing the key ID check program. Thus, it is likely that vehicles will be intruded and stolen by using a key which does not have the same ID as stored in the EEPROM.

SUMMARY OF THE INVENTION

It is therefore an object of the present invention to provide a program rewriting control and devices therefor for preventing unauthorized intrusion and burglary.

According to the present invention, an electronic control unit has a non-volatile rewritable memory storing a program therein. An external rewriting device is connected to the electronic control unit when the program is to be rewritten. A first code such as a key identification code is transmitted from a transponder to the control unit. The control unit checks for an agreement between the first code and a second code stored in the control unit for attestation. A third code such as a program identification code is transmitted from the rewriting tool to the control unit. The control unit checks for an agreement between the third code and a fourth code stored in the electronic control unit for attestation. A new program is transmitted from the rewriting tool to the electronic control unit, preferably when check results are in predetermined relations, respectively. The stored program in the rewritable memory is rewritten by the transmitted new program.

BRIEF DESCRIPTION OF THE DRAWINGS

Other objects, features and advantages of the present invention will become more apparent from the following detailed description made with reference to the accompanying drawings. In the drawings.

DETAILED DESCRIPTION OF THE PREFERRED EMBODIMENT

The present invention will be described in further detail with reference to its embodiment. The present invention is applied to an electronic control apparatus for automotive vehicle engines in the following embodiment.

Figure 1:
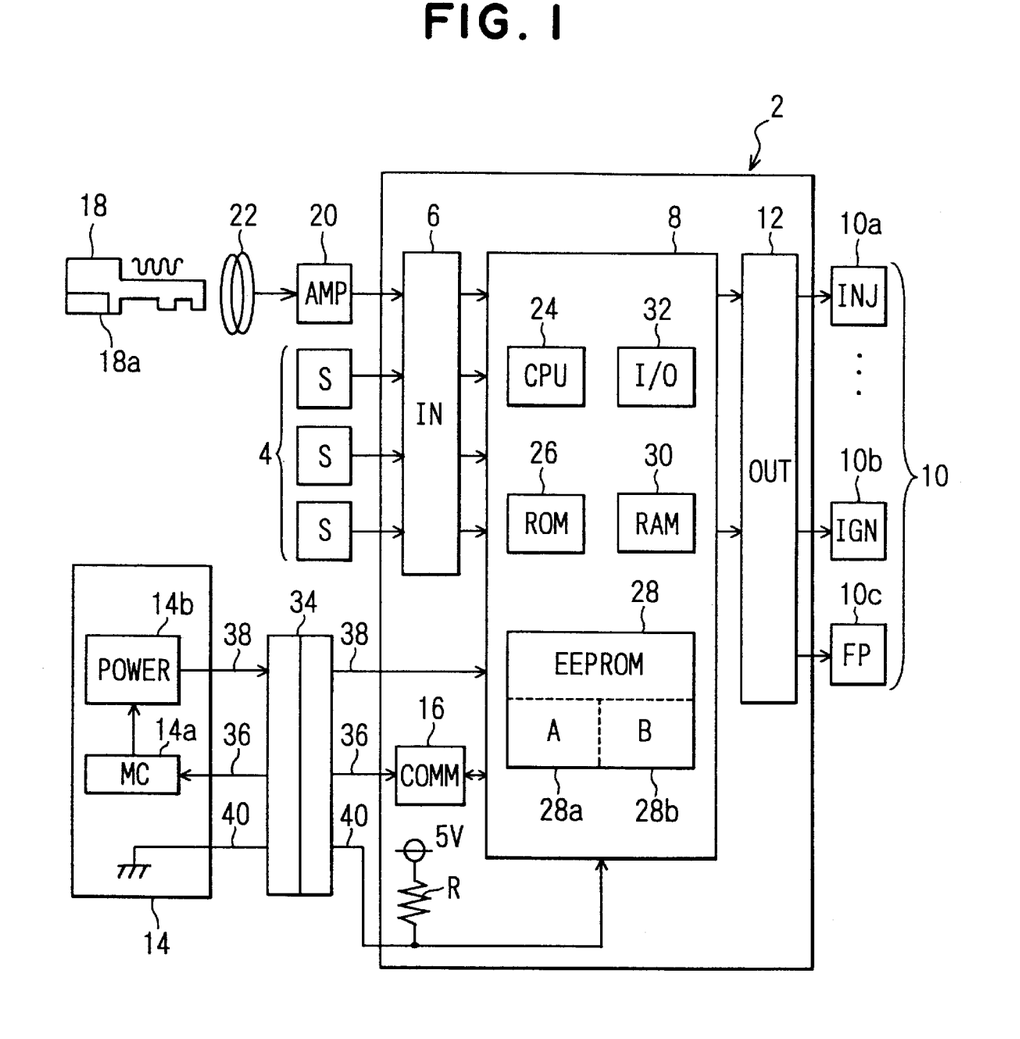
FIG. 1 is a block diagram showing an electronic control apparatus for engines having a program rewriting control function according to an embodiment of the present invention.

Referring first to FIG. 1, an electronic control apparatus is comprised of an electronic control unit (ECU) 2 for engines, sensors 4, and actuators 10 such as injectors 10a, an igniter 10b and a fuel pump 10c. The ECU 2 includes an input circuit 6 for wave-shaping sensor signals from the sensors 4, a microcomputer 8 for calculating optimum engine control amounts such as fuel injection amount, ignition timing and fuel pressure, and an output circuit 12 for driving the actuators 10 based on the calculated control amounts. The ECU 2 also includes a communication circuit 16, which executes communications between a program rewriting tool 14 and the microcomputer 8 when an engine control program is to be rewritten or updated.

A vehicle key 18 is an electronic-type key which is provided with a transponder 18a. The transponder 18a is provided therein with a n-bit key identification code (ID) exclusive thereto. An antenna 22 is connected to the input circuit 6 through an amplifier 20, so that the key ID may be applied to the microcomputer 8 therethrough. The transponder 18a is constructed to receive and store electric power in its capacitor upon reception of excitation signals from a vehicle side, when the key 18 is inserted into a key cylinder. Further, the transponder 18a is constructed to operate as a signal transmitter/receiver with the stored electric power.

The microcomputer 8 has a central processing unit (CPU) 24 which operates on stored programs, non-volatile read-only memory (ROM) 26 which stores the programs and data, non-volatile electrically erasable programmable read-only memory (EEPROM) 28 which stores programs and data, and a random access memory (RAM) 30 which stores the calculation results of the CPU 24 and the like. The microcomputer 8 further has an input/output circuit 32 which receives signals from the input circuit 6 and the communication circuit 16, and outputs control signals to the output circuit 12.

Figure 2:
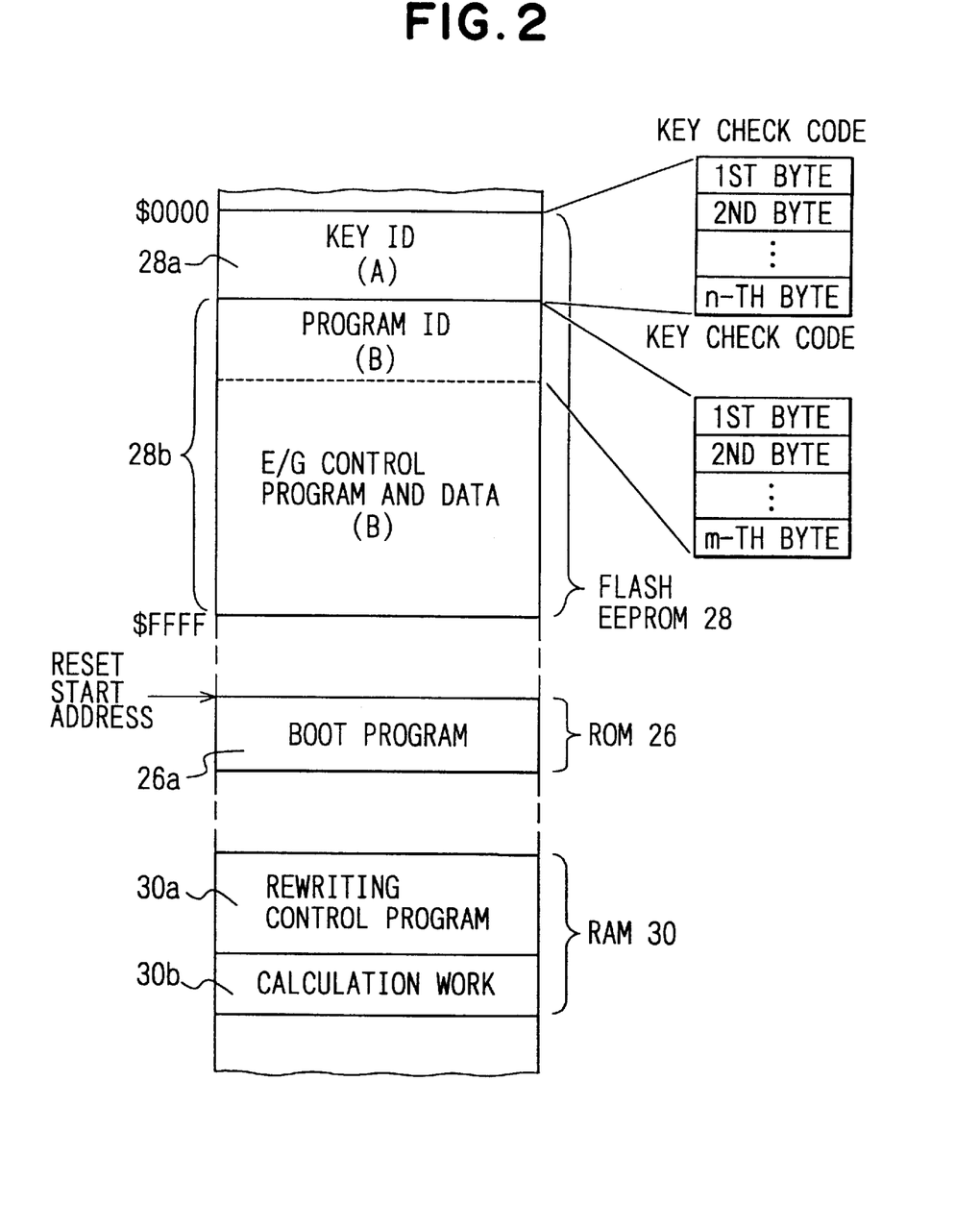
FIG. 2 is a schematic diagram showing a construction of a memory used in the embodiment shown in FIG. 1.

The EEPROM 28 stores in its A-storage area 28a a predetermined key ID exclusive to the ECU 2, and in its B-area a program ID and a program. The EEPROM 28 may be a flash type (erasable/rewritable) which is capable of erasing and rewriting a part of data once written.

The program rewriting tool 14 is used as an external device to the ECU 2. The rewriting tool 14 has a microcomputer 14a and a power circuit 14. The microcomputer 14a is programmed to execute serial communications with the microcomputer 8 so that the program and/or data stored in the EEPROM 28 may be rewritten therethrough. The power circuit 14b is constructed to supply the microcomputer 8 with a high voltage (12 volts) required to rewrite the EEPROM 28.

The ECU 2 and the rewriting tool 14 are connected to each other through respective communication lines 36, power supply lines 38 and mode check lines 40 through an electrical connector 34. The electrical connector 34 normally separates the rewriting device 14 from the ECU 2, but connects them when rewriting the program and data of the EEPROM 28 is required. The microcomputer 8 of the ECU 2 and the microcomputer 14a of the rewriting tool 14 are enabled to execute serial communications therebetween through the communication lines 36. The microcomputer 8 of the ECU 2 is supplied with the required voltage (12 V) from the power circuit 14b of the rewriting tool 14 through the power supply lines 38 to rewrite the EEPROM 28.

The mode check line 40 is pulled up to a positive voltage (5 V) in the ECU 2 by a resistor R, and is connected to ground (0 V) in the rewriting tool 14. When the rewriting device 14 is connected to the ECU 2 through the connector 34, the mode check line 40 in the ECU 2 is changed to low level (0 V) from its normal high level (5 V). The microcomputer 8 thus determines with this low level that the rewriting tool 14 is connected to the ECU 2.

The EEPROM 28 has two storage areas, that is, the A-area 28a and B-area 28b, as shown in FIG. 2. The A-area 28a stores therein a key identification code (key ID) having "n" bytes (for instance 8 bytes) which varies from ECU to ECU (vehicle to vehicle). The B-area 28b stores therein a program and data for engine controls. The B-area 28b specifically stores at the head address thereof preceding program and data addresses a program identification code (program ID) having "m" bytes (for instance 4 bytes) indicative of the engine control program. The key ID is for checking whether the key 18 is an authorized one. The program ID is for checking the vehicle model, destination and program version.

The ROM 26 has a storage area 26a in which a boot program is stored. The boot program is executed immediately after a reset operation. The RAM 30 has two storage areas, that is, EEPROM rewriting control program storage area 30a and operation work area 30b. The storage area 30a is used to store therein an EEPROM rewriting control program transmitted from the rewriting tool 14. The work area 30b is used in the course of execution of the transmitted rewriting control program.

The EEPROM 28, ROM 26 and RAM 30 store in each address thereof 8-bit data. The A-area 28a and B-area 28b of the EEPROM 28 are set to 64K bytes, from address $0000 to address $FFFF.

The microcomputer 8 is programmed to initiate the boot program set as the reset start address as shown in FIG. 2 immediately after the reset operation. It is also programmed to call the engine control program by the boot program and execute the same, when the rewriting tool 14 is not connected.

When the microcomputer 8 determines that the rewriting tool 14 is connected at the time of initiation of the boot program, it stores in the rewriting program storage area 30a of the RAM 30 the rewriting control program transmitted from the rewriting tool 14 through the communication lines 38. Then, it initiates the stored rewriting control program to rewrite or update the existing program ID and program stored in the EEPROM 28 with the new program ID and program transmitted from the rewriting tool 14.

Figure 3:
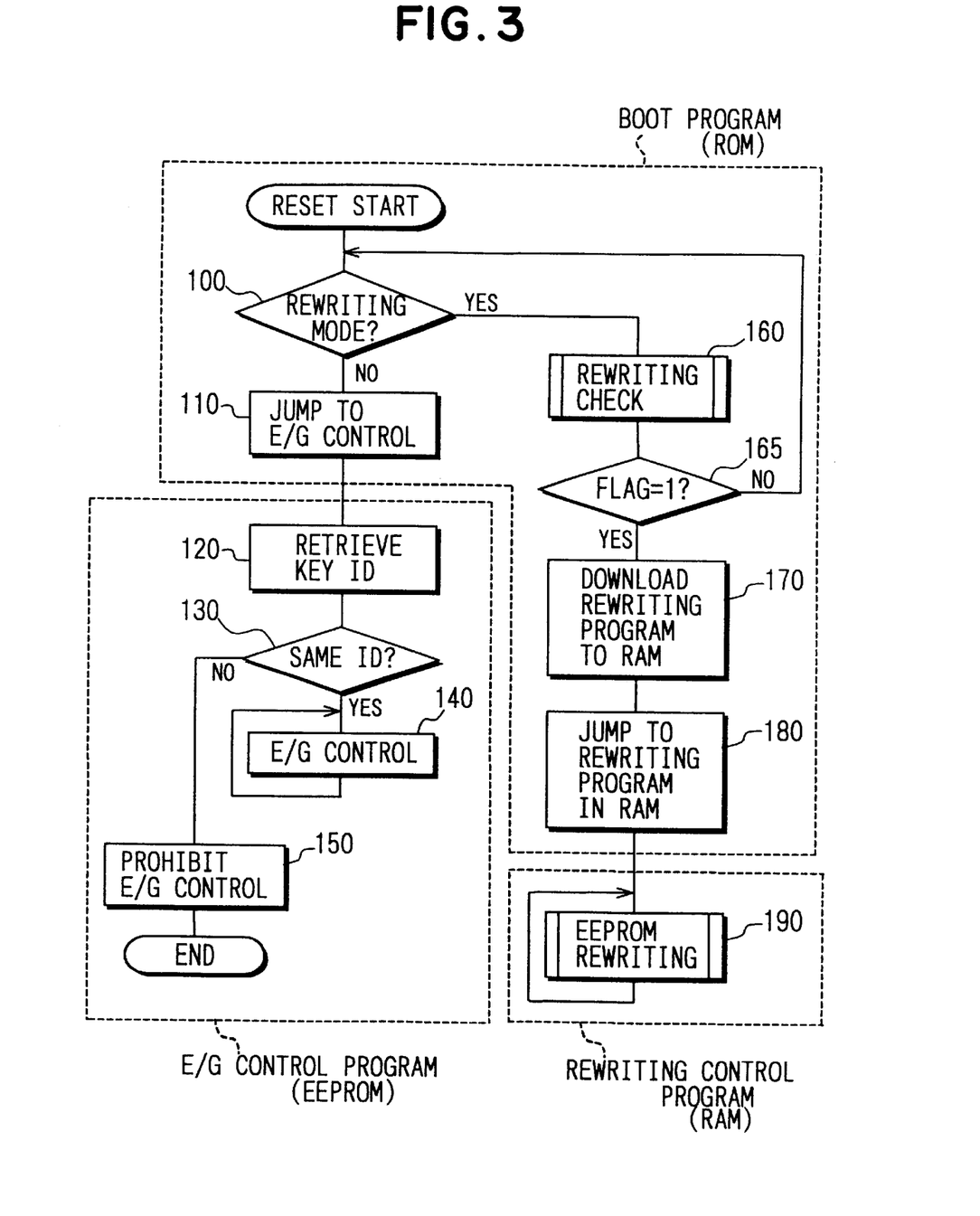
FIG. 3 is a flow diagram showing an entire program executed in an ECU used in the embodiment shown in FIG. 1.
Figure 4:
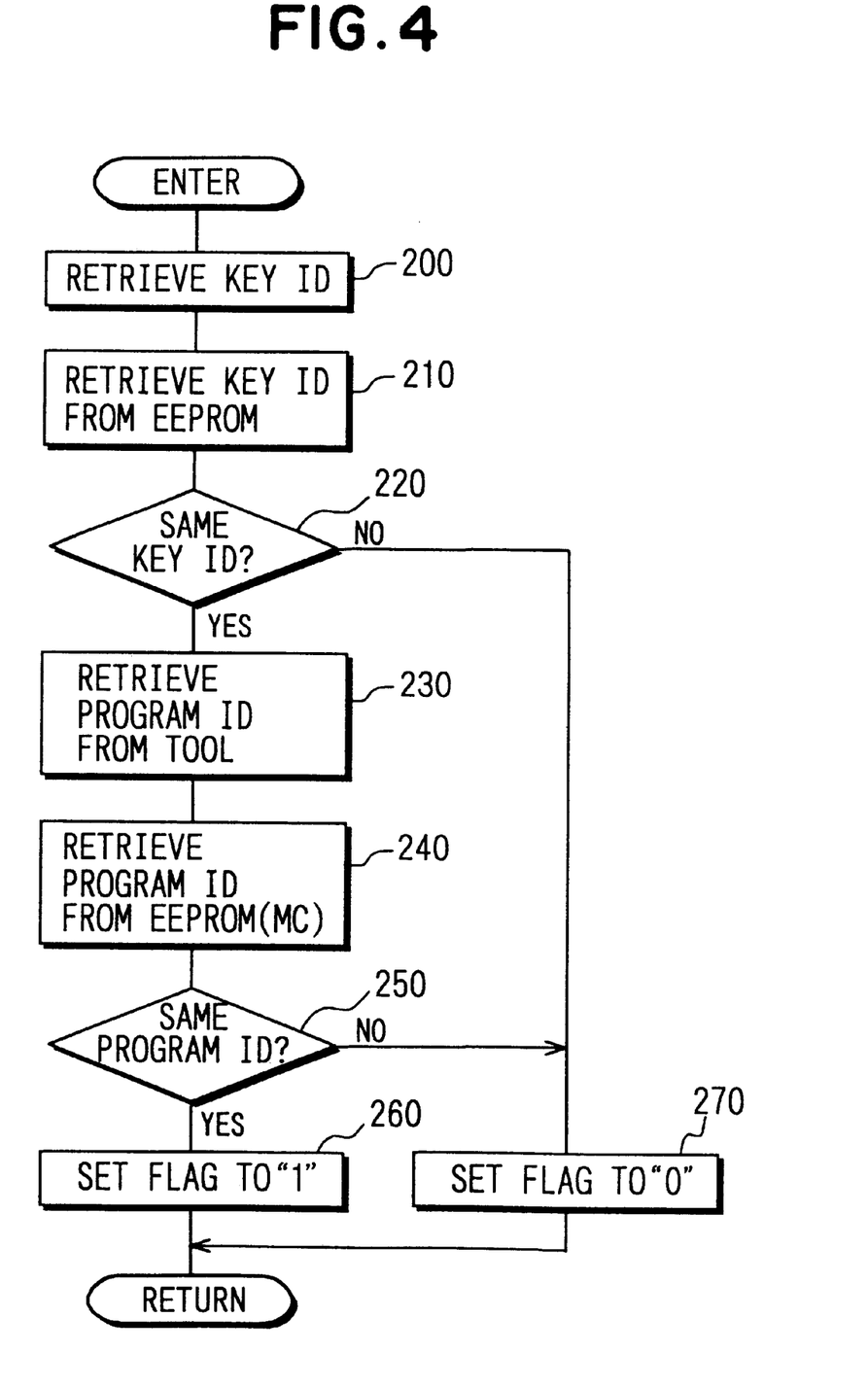
FIG. 4 is a flow diagram showing rewriting check processing which is a part of the program shown in FIG. 3.

This operation of the microcomputer 8, particularly CPU 24, is described in detail with reference to FIGS. 3 to 5.

The CPU 24 is reset to start its operation when the ECU 2 is powered on with electric power. The CPU 24 first executes the boot program stored in the ROM 26.

Specifically, the CPU 24 first checks at step 100 whether the mode check line 40 is at the low level indicating the EEPROM rewriting mode. If it is not the rewriting mode, the CPU 24 determines that the rewriting device 14 is not connected. The processing then jumps at step 110 to the engine control program stored in the EEPROM 28.

The CPU 24 then retrieves or reads out the key ID indicative of the key 18. Specifically, the CPU 24 drives the amplifier circuit 20 to transmit the excitation signal from the antenna 22 to the transponder 18a of the key 18. The CPU 24 terminates the excitation operation after a predetermined time period (for instance 50 ms). The transponder 18a is thus energized to operate. The CPU 24 then drives the amplifier 20 to transmit a request signal from the antenna 22 to the transponder 18a. The transponder 18a in response transmits a key identification code (key ID) signal specific to the key 18 to the antenna 22. Thus, the CPU 24 determines the key ID from the received key ID signal.

The CPU 24 then checks at step 130 whether the retrieved key ID coincides with (same as) the key ID stored in the EEPROM 28. In this checking step, all numerical value of byte data of the key ID (FIG. 2) are checked for agreement. The CPU 24 executes steps 140 and 150, if all byte data are the same (key 18 is the authorized one) and any one of byte data is different (key 18 is not the authorized one), respectively.

At step 140, the CPU 24 repeatedly executes the engine control processing. Specifically, the CPU 24 calculates the optimum fuel injection amount, ignition timing and the like based on the engine operating conditions detected by sensors 4 and the engine control data stored in the EEPROM 28. It produces the control signals to drive the actuators 10 through the output circuit 12 based on the calculation results. At step 150, however, the CPU 24 prohibits the engine control and ends this routine. That is, it disables the operations of the actuators 10.

If it is the rewriting mode (YES at step 100), on the other hand, the CPU 24 executes a rewriting processing at step 160. In this rewriting check processing, the CPU 24 checks whether the key ID retrieved from the key 18 and the key ID stored in the EEPROM 28 are the same, and further whether the program ID retrieved stored in the rewriting tool and the program ID stored in the EEPROM 28 are the same.

This rewriting check processing at step 160 is described in further detail with reference to FIG. 4.

The CPU 24 first retrieves the key ID from the transponder 18 at step 200 in the same manner as in step 120, and retrieves the key ID from the EEPROM 28. The CPU 24 then checks at step 220 whether the two retrieved key IDs are the same. The CPU executes steps 230 and 270 if the key IDs are the same (YES) and different (NO), respectively.

At step 270, the CPU 24 sets a rewriting flag to "0" and ends this sub-routine. The rewriting flag "0" indicates use of unauthorized key and is set to "0" each time the CPU 24 is initialized. At step 230, however, the CPU 24 retrieves the program ID stored in the rewriting tool 14. The CPU 24 then retrieves the program ID stored in the EEPROM 28 of the microcomputer 8 at step 240, and checks at step 250 whether the two retrieved program IDs are the same.

In this program ID checking processing, the two IDs are compared byte by byte with respect to the vehicle model and the destination. The CPU 24 provisionally determines YES and NO, if all the compared data byte are the same and if any compared data byte is different, respectively. The CPU 24 further checks whether the version data in the program ID received from the rewriting tool 14 are the same as or newer than that stored in the EEPROM 28. The CPU 24 finally determines YES, only when the vehicle model data and the destination are the same and the version data are the same or new.

The CPU 24 sets at step 260 the rewriting flag to "1" in response to the check result YES of step 250 indicating that the program ID of the rewriting tool 14 is the same as that stored in the EEPROM 28. However, it sets the flag to "0" at step 270 in response to the check result NO of step 250. Thus, the flag "1" indicates that the rewriting program of the rewriting tool 14 is an acceptable or appropriate one.

After the above rewriting check processing at step 160, the CPU 24 executes step 165 to check whether the rewriting flag is "1", that is, whether the control program and data rewriting should be executed. The CPU 24 executes step 170 or step 100, if the check result is YES and NO, respectively. At step 170, the CPU 24 downloads the rewriting program from the rewriting tool 14 into the RAM 30 of the microcomputer 8 through the communication lines 38. The CPU 24 then executes step 180 to initiate the rewriting program stored in the RAM 30.

The CPU 24 then executes the control program and data rewriting processing at step 190 based on the initiated rewriting program. That is, the CPU 24 rewrites or updates the control program and data for the engine control stored in the EEPROM 28 with new control programs and data which is sent from the rewriting tool 14.

Figure 5:
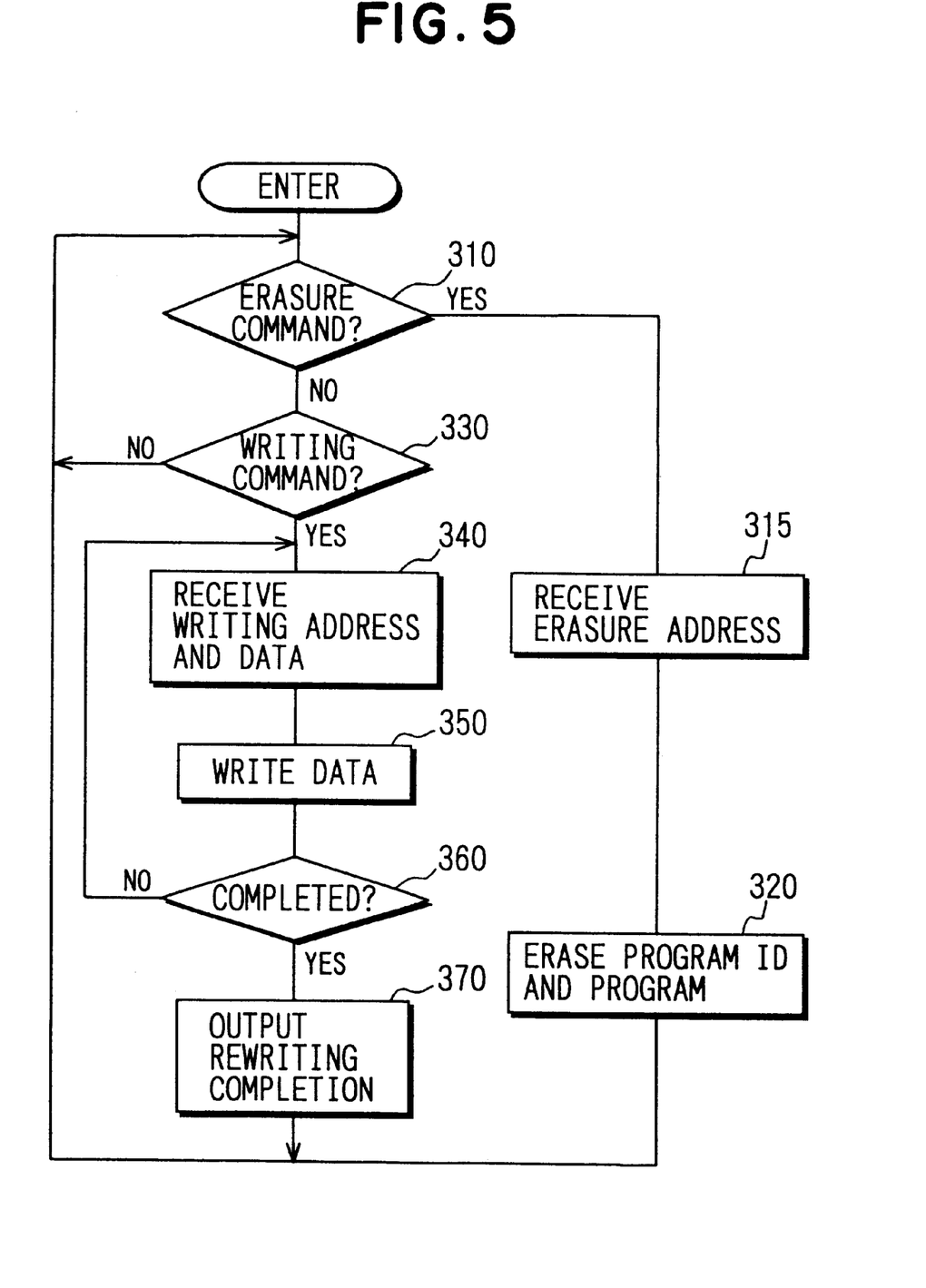
FIG. 5 is a flow diagram showing EEPROM rewriting processing which is a part of the program shown in FIG. 3.

The rewriting processing at step 190 is shown in detail in FIG. 5. Specifically, the CPU 24 first checks at step 310 whether an erasure command has been received from the rewriting tool 14. If it has been received (YES), the CPU 24 receives at step 315 erasure addresses, that is, addresses of the program ID and the control program stored in the EEPROM 28 which are to be erased. The CPU 24 then erases at step 320 the contents in the designated erasure addresses, that is, the program ID and the control program.

If the erasure command has not been received (NO at step 310), the CPU 24 checks at step 330 whether a writing command has been received from the rewriting tool 14. If it has been received (YES), the CPU 24 receives at step 340 the writing addresses and new data or contents from the rewriting tool 14. The new contents includes the program ID and new program to be rewritten. The CPU 24 then writes at step 350 the received new data over the previous one stored in the designated addresses of the EEPROM 28.

The CPU 24 then checks at step 360 whether the new data have all been rewritten into the EEPROM 28, that is, whether the rewriting operation has been completed. The CPU 24 repeats the above steps 340 to 360 until all new data have been rewritten. If the rewriting operation has been completed (YES), the CPU 24 outputs at step 370 a rewriting completion signal to the rewriting tool 14 through the communication lines 36. The rewriting tool 14 may preferably be constructed to display a rewriting completion message on its display unit.

According to the present embodiment, the rewriting is enabled only when the key ID agrees to the stored one in the ECU 2. Thus, the rewriting operation is disabled when the key 18 is an unauthorized one, improving the anti-burglary function. As long as the key 18 is an authorized one, the control program and data of the ECU 2 can be rewritten to rectify any detects in the control program and data at maintenance shops, etc., while maintaining the ECU 2 as mounted in the vehicle.

Further, the rewriting is enabled only when the program ID of the rewriting tool 14 agrees to the stored one in the ECU 2 in addition to the agreement of the key ID. Thus, the ECU 2 is protected from being illegally changed to have improper control program and data, thus improving further the anti-burglary function.

In addition, the key ID is stored in the EEPROM 28 and rewritable. The key ID can be changed to a new one, immediately after the key 18 is stolen. As a result, the ECU 2 can be protected from any unauthorized rewriting which may be tried by using the stolen key 18.

The present invention may also be implemented as follows.

In this embodiment, a ciphered function data is used as an attestation data in place of the key ID used in the above embodiment. Therefore, the transponder 18a of the key 18 is constructed to store the function data Ft(X), and the EEPROM 28 is constructed to store the same function data Ft(X). For instance, the function Ft(X) may be defined as follows by using addition, subtraction, multiplication and/or division.

$$Ft(X)=(X^2+2)/5+X/2+(X-1)/2+$$

In operation, the CPU 24 drives the amplifier circuit 20 to transmit the excitation signal from the antenna 22, so that the transponder 18a is energized. The CPU 24 then outputs an interrogatory data X to the amplifier circuit 20. This data X is a digital data which is a combination of "1" and "0". The amplifier circuit 20 converts or modulates each bit of the interrogatory data into corresponding signal frequency F0 or F2 and transmit it as the request signal from the antenna 22 to the key 18.

The transponder 18a calculates an answer data Yt from the function data Ft(X) using the interrogatory data X as a variable. It then transmits a reply signal having frequencies F0 and F1 in correspondence with the calculated data Yt which is also a digital data (combination of "1" and "0"). The amplifier circuit 20 receives this reply signal through the antenna 22, and converts or demodulates it into a corresponding digital data.

The CPU 24 calculates its answer data Ye from a function data Fe(X) stored in the EEPROM 28 using the interrogatory data X which is also used to transmit the request signal to the key 18. The CPU 24 then checks whether the key 18 is an authorized one by comparing the two calculated data Yt and Ye. This embodiment will provide a higher anti-burglary function owing to the use of ciphered function data.

The present invention should not be limited to the embodiments described above, but may further be modified as follows.

For instance, the key ID may be stored in the ROM 26 in place of being stored in the EEPROM 28 so that it may not be changed. The program rewriting may be enabled by checking for an agreement between one of the key IDs or the program IDs. The key ID, control program and program ID may be stored in separate memories using a plurality of EEPROMs. The EEPROM may be replaced with other types of rewritable ROMs. The rewriting control program may be stored in a non-rewritable ROM in place of storing it in the rewriting tool 14 and downloading it into the RAM 30. The ECU may be for a vehicle brake control, transmission control, suspension control or the like. The transponder 18a may be provided separately from the key 18.

Further, an anti-burglary device may be provided separately from the ECU 2. That is, the anti-burglary device may be provided between the amplifier circuit 20 and the ECU 2. In this instance, the anti-burglary device is constructed to apply an engine-start enabling code to the ECU 2, after the agreement between the key Ids is confirmed by the anti-burglary device. The ECU 2 stores in its EEPROM an engine-start enabling code. The ECU 2 checks for an agreement of the engine-start enabling codes received from the anti-burglary device and stored in the EEPROM 28.

Still further, in the case of using the ciphered function data, the key 18 may be determined as the authorized one as long as the calculation results Yt and Ye are in a predetermined relation.

In addition, the microcomputer 8 may be programmed to disable the rewriting operation when a vehicle engine is in the cranking condition. In this instance, the microcomputer 8 checks whether the engine is cranking, after step 165 shown in FIG. 3 determines YES (flag=1). The microcomputer S is allowed to execute the following step 170, only when it is confirmed that the engine is not in the cranking condition. The microcomputer 8 is programmed to disable the rewriting operation by just repeating a predetermined sequence of steps so that the rewriting process may be skipped, or to shut down a supply of power.

The rewriting control may also be applied to other devices than vehicle control, as long as a program in a memory such as micro chip, floppy disk, hard disk, optical disk and the like is to be rewritten.

What is claimed is:

1. An electronic control apparatus comprising:
    a memory having a first storage area for storing an attestation data, and a second storage area for storing a control content required for controlling a control object and capable of rewriting the control content;
    input means for inputting a code data transmitted from an external device which allows an operation of the control object;
    checking means for checking for an agreement between the transmitted code data and the stored attestation data; and
    rewriting means for rewriting the control content in the second storage area in response to a check result of the checking means.

2. A program rewriting method for an electronic control unit comprising:
    connecting a rewriting tool to the electronic control unit which stores a program therein;
    transmitting a first code from a transponder to the electronic control unit;
    checking for, within the electronic control unit, an agreement between the first code and a second code stored in the electronic control unit;
    transmitting a third code from the rewriting tool to the electronic control unit;
    checking for, within the electronic control unit, an agreement between the third code and a fourth code stored in the electronic control unit;
    transmitting a new program from the rewriting tool to the electronic control unit, when check results of the checking steps are in predetermined relations, respectively; and
    rewriting the stored program by the new program.

3. An electronic control apparatus comprising:
    a first non-volatile memory storing an attestation reference data of a key;
    a second non-volatile memory storing a control content required for controlling a control object, the second memory being capable of rewriting the control content in response to a predetermined operation of the key and an external rewriting command;
    retrieving means for retrieving an attestation data of the key;
    checking means for checking for an agreement between the retrieved attestation data and the stored reference data; and
    disabling means for disabling rewriting of the control content stored in the second non-volatile memory, when a check result of the checking means indicates a disagreement between the retrieved attestation data and the stored reference data.

4. An electronic control apparatus of claim 3, wherein the control content includes at least one of a control program and a data used in execution of the control program.

5. An electronic control apparatus of claim 3, wherein the first non-volatile memory is a rewritable type capable of rewriting the stored reference data.

6. An electronic control apparatus of claim 3, wherein the first non-volatile memory is incapable of rewriting the stored reference data.

7. An electronic control apparatus of claim 3, further comprising:
    a circuit for transmitting a request signal to a transponder associated with the key and receiving a response signal including the attestation data from the transponder.

8. An electronic control apparatus comprising:
    a non-volatile memory storing a program and an attestation data of the stored program, and capable of rewriting the stored program;
    retrieving means for retrieving from an external device an attestation data of a new program to be written over the stored program;
    checking means for checking for an agreement between the retrieved attestation data of the new program and the stored identification data; and
    disabling means for disabling rewriting of the new program into the non-volatile memory, when a check result of the checking means indicates a disagreement between the retrieved attestation data and the stored attestation data.

9. An electronic control apparatus of claim 8, wherein the attestation data is a predetermined identification data.

10. An electronic control apparatus of claim 8, wherein the attestation data is a predetermined ciphered function data.

11. An electronic control apparatus of claim 8, wherein:
    the non-volatile memory is for further storing a reference data;
    the retrieving means is for further retrieving a key data form the key;
    the checking means is for further checking for an agreement between the retrieved key data and the reference data; and
    disabling means for further disabling rewriting of the new program into the non-volatile memory, when a check result of the checking means indicates a disagreement between the retrieved key data and the stored reference data.

12. An electronic control apparatus of claim 11, further comprising:
    prohibiting means for prohibiting execution of the program stored in the non-volatile memory when the check result of the checking means indicates the disagreement between the retrieved key data and the stored reference data.

13. An electronic control apparatus comprising:

a memory having a first storage area for storing an attestation data, and a second storage area for storing a control content required for controlling a control object and capable of rewriting the control content;

input means for inputting a code data transmitted from an external transponder;

checking means for checking for an agreement between the transmitted code data and the stored attestation data; and rewriting means for rewriting the control content in the second storage area in response to a check result of the checking means.

14. An electronic control apparatus of claim 13, wherein the rewriting means is for disabling rewriting of the control content in the second storage area, when a check result of the checking means indicates a disagreement between the transmitted code data and the stored attestation data.

15. An electronic control apparatus of claim 13, wherein the rewriting means is for enabling rewriting of the control content in the second storage area, only when a check result of the checking means indicates the agreement between the transmitted code data and the stored attestation data.

16. An electronic control apparatus of claim 13, wherein the memory includes, as the first storage area, a non-volatile memory device capable of rewriting the stored attestation data.

17. An electronic control apparatus of claim 13, wherein the memory includes, as the first storage area, a non-volatile memory device incapable of rewriting the stored attestation data.

18. An electronic control apparatus of claim 13, wherein:

the transmitted code data is stored in the transponder;

the input means is for further transmitting a request signal to the transponder; and the transponder is for transmitting the code data to the input means in response to the request signal.

19. An electronic control apparatus of claim 13, wherein a predetermined program sequence is repeated without rewriting, when a check result of the checking means indicates a disagreement between the transmitted code data and the stored attestation data.

20. An electronic control apparatus of claim 13, wherein a power supply is shut down, when a check result of the checking means indicates a disagreement between the transmitted code data and the stored attestation data.

21. An electronic control apparatus of claim 13, wherein the control content includes at least one of a control program and a data used in execution of the control program.

22. An electronic control apparatus of claim 21, wherein:

the second storage area is for further storing the data used in execution of the control program as another code data;

the first storage area is for further storing program attestation data;

the checking means is for further checking an agreement between the another code data and the program attestation data; and the rewriting means is for further disabling rewriting of the control program into the second storage area, when a check result of the checking means indicates a disagreement between the another code data and the program attestation data.

23. An electronic control apparatus of claim 22, wherein the another code data is a ciphered function data.

24. An electronic control apparatus of claim 13, wherein the control content is a control program for controlling an engine of a vehicle.

25. An electronic control apparatus of claim 24, wherein the transponder is integrated with a key for operating the engine.

26. An electronic control apparatus of claim 25, wherein the rewriting means is for further rewriting the control data when the key is inserted into a key cylinder and before the engine is operated.

* * * * *